United States Patent
Hamrelius et al.

(10) Patent No.: US 7,034,300 B2
(45) Date of Patent: Apr. 25, 2006

(54) INFRARED CAMERA SENSITIVE FOR INFRARED RADIATION

(75) Inventors: U. Torbjorn Hamrelius, Sollentuna (SE); S. Tomas Lannestedt, Alvsjo (SE)

(73) Assignee: Flir Systems AB, Däneryd (SE)

( * ) Notice: Subject to any disclaimer, the term of this patent is extended or adjusted under 35 U.S.C. 154(b) by 244 days.

(21) Appl. No.: 10/476,217

(22) PCT Filed: May 7, 2001

(86) PCT No.: PCT/SE01/00983

§ 371 (c)(1), (2), (4) Date: Oct. 28, 2003

(87) PCT Pub. No.: WO02/091735

PCT Pub. Date: Nov. 14, 2002

(65) Prior Publication Data

US 2004/0124359 A1    Jul. 1, 2004

(51) Int. Cl.
*G01J 5/02*    (2006.01)

(52) U.S. Cl. ...................... 250/332; 250/330

(58) Field of Classification Search ................ 250/330, 250/332
See application file for complete search history.

(56) References Cited

U.S. PATENT DOCUMENTS

| | | | |
|---|---|---|---|
| 3,808,439 A * | 4/1974 | Renius | 250/334 |
| 4,411,487 A * | 10/1983 | Miller et al. | 250/330 |
| 4,561,775 A * | 12/1985 | Patrick et al. | 356/5.04 |
| 4,868,768 A * | 9/1989 | Draggoo et al. | 702/135 |
| 5,077,609 A | 12/1991 | Manelphe | |
| 5,386,117 A * | 1/1995 | Piety et al. | 250/330 |
| 5,524,984 A | 6/1996 | Hollander et al. | |
| 5,836,694 A | 11/1998 | Nguyen | |
| 5,839,829 A | 11/1998 | Litvin et al. | |
| 6,095,682 A * | 8/2000 | Hollander et al. | 374/121 |
| 6,183,129 B1 | 2/2001 | Aoyama et al. | |
| 6,267,500 B1 * | 7/2001 | Hollander et al. | 374/121 |
| 6,343,874 B1 * | 2/2002 | Legrandjacques et al. | 374/5 |
| 6,649,912 B1 * | 11/2003 | Salapow et al. | 250/330 |
| 2003/0047683 A1 * | 3/2003 | Kaushal | 250/330 |
| 2004/0264542 A1 * | 12/2004 | Kienitz | 374/120 |

FOREIGN PATENT DOCUMENTS

| EP | 0 542 561 | 5/1993 |
|---|---|---|
| EP | 1 065 483 | 1/2001 |

OTHER PUBLICATIONS

Murashima Susuma, "Method and Device for Measuring Temperature of Coal Storage Pile", Nov. 26, 1998, Appln No. 10335833, Publication No. 2000159315A, Publication date Jun. 13, 2000.

* cited by examiner

*Primary Examiner*—Albert Gagliardi
(74) *Attorney, Agent, or Firm*—Young & Thompson

(57) ABSTRACT

An infrared camera includes a detector sensitive to infrared radiation and optics for focusing an object to be monitored on the detector. A light source emits a narrow beam within the visible wavelength region towards the object to be imaged by the detector.

34 Claims, 3 Drawing Sheets

INFRARED CAMERA SENSITIVE FOR INFRARED RADIATION

TECHNICAL FIELD

The invention relates to a method for an infrared, below called IR, camera of the kind stated in the preamble of claim 1, and an IR camera of the kind stated in claim 11.

BACKGROUND OF THE INVENTION

Often, an infrared camera has lower resolution than a visual camera. An object to be shown on a display always looks different when recorded in the infrared spectral region than it looks for the human eye in the visible wavelength region. Therefore, it is sometimes very difficult to identify with the eye looking directly at objects to be inspected which part of an object or which one of several objects that has a thermal anomaly that is easily identified in the infrared camera.

When inspecting with an IR camera for example electrical installation where there might be multiple connections, breakers or fuses to inspect there is a risk of accidentally pointing out the wrong element to be replaced or repaired. This is due to difficulties to interpret and identify the location of objects shown in the infrared image. The same problem is also due when inspecting buildings or walls looking for missing or bad insulations, structural damages, for example missing of reinforcements, cracks in concrete, walls, moisture, or water damages. These are only some examples of problems to be solved by the invention. The difficulties and uncertainties in interpreting the infrared images also slow down the inspections since the operator always needs to look around the object or count parts in it to really be sure that he with his eye has identified the right target, which has the thermal anomaly.

Thus there is a problem to directly know or see on the actual target where the faulty part is located that has been identified to have a thermal anomaly in the infrared camera image. There is also a problem to make inspection of electrical installations or buildings fast and accurate and at the same time eliminate the risk of accidentally pointing out the wrong location of the fault or a wrong component or part.

DESCRIPTION OF RELATED ART

EP 0 524 561 A1 describes a high-energy radiation survey system provided on a remotely controlled vehicle. It is operated from an operator's station and is used to generate high resolution radiation dose maps superimposed on a real-time video image of areas in nuclear power plants or the like. In order to pinpoint a radiation source, the system is able to detect the radiation coming from a well-defined direction. A range finder, a video camera and a laser pointer are mounted on the same platform as a radiation detector. They are aligned to point in the same direction as the radiation detector. When the radiation detector has discovered a radiation source the laser pointer creates a bright spot which is intended to be seen on the video image to indicate the approximate center of the field of view of the radiation detector.

JP-2000159315 A shows an IR radiation thermometer, which measures the surface temperature of a coal-storage mountain. A laser pointer is attached to the thermometer and radiates for temperature compensation a laser beam on the position, which temperature the thermometer measures.

THE INVENTION

An object according to the invention is to provide a method for the person handling an IR camera to identify the measured object in surroundings in an image recorded by a camera, and a camera having the identifying possibilities.

Another object of the invention is to provide a fast and accurate inspection of objects having thermal anomalies, such as electrical installations or buildings, by means of an IR camera, which preferably is handheld.

Still another object of the invention is to provide a method and a camera where the risk of accidentally pointing out in an object a wrong location, from which an image is recorded, is eliminated.

These objects are overcome by a method having the features according to the characterizing part of claim 1. Further developments and features and a camera are apparent from the rest of the claims.

The invention is directed to a method for identifying an object in space, which is monitored by an infrared camera having detector means sensitive for infrared radiation and optics for focusing an object to be monitored on the detector means. The invention is characterized by providing a light source having a narrow beam within the visible wavelength region; and pointing the beam at the object monitored by the infrared camera. The camera is preferably of radiometric type, i.e. it measures the temperatures shown on its display. Thus, it could be, but is preferably not, only a vision and thermal imaging device.

The light source beam could be divided into several light beams; and the beams could be pointed so as to mark the extension of the area on the object to be viewed in the infrared camera. This mark could be the smallest area to be provided in order to make a correct measurement. The mark could thus be an area, which the whole measuring point fills. The mark could thus be an area surrounded by a circle, an oval, a rectangle, a polygon or the like. The beam(s) from the light source could be directed to hit the object at predetermined places in relation to what is shown on the infrared image. The places in the infrared image for the hit spots could be calculated, and the calculated markers could be shown on the infrared image. The beam from the light source could be directed on to a part of the object to be inspected, after which an infrared image or a video recording of the part is taken or a checking in the infrared camera is done.

The invention also gives a possibility when multiple parts are to be inspected and the operator knows which part to inspect. The infrared camera can then be directed to the part to be inspected by pointing the light source at the part and then check in the infrared camera if the part you want to inspect have any thermally anomalies or not.

The IR camera is preferable handheld in order to point to different objects that have thermal anomalies or are to be inspected. The method is directed to use such device to point out faulty parts or areas in the surroundings when an operator performs inspections, for example of electrical installation or buildings.

However, the invention is not limited to a handheld IR camera. It could also be used as a remotely controlled IR camera installed for process, monitor, or machine vision for industrial applications, when monitoring integrated circuits or other manufacturing.

The invention also relates to an infrared camera comprising detector means sensitive for infrared radiation and optics for focusing an object to be monitored on the detector means. The invention is characterized by light source means emitting at least one narrow beam within the visible wavelength region towards the object to be imaged by the detector means. The infrared detector means is preferably an infrared focal plane array (FPA).

A distance meter could measure the distance to the object to be monitored, and an adjustment device for the optics could be operated by means of signals derived from the distance meter. A processing means could be connected to the distance meter and to the adjustment device for the optics and control the optics to focus the object on the detector means. The optics when focusing either manual or by auto focus can actually be used as the distance meter that controls the graphics or any of the other parallax compensations. The processing device could be provided with software adapted to compensate for the focus distance provided by the distance meter, or by movements of the optics made by the operator, in order to move the beams from the light source to hit the target object at a wished hit spot. The processing device could be connected to a display showing the monitored IR image and compute at least one marker representing the hit point of the light beam(s) emitted from the light source on the object. Thus, the processing device creates a graphic representation, and this representation is moved on the display to illustrated the hit spot on the object by the beam(s) emitted by the light source device, whether it is directed parallel to the optical axis of the camera or has been moved to hit the target object in the middle of the object presented on the display.

A parallax compensation device could comprise a motor setting the light source in a controlled angular direction to direct its beam towards the target or it could be placed in front of the light source bending the visible light source beam towards the target. The parallax compensation device could then be controllable in relation to the focal distance to the target. However, it is to be noted that the angular setting could be a manual mechanical adjustment as a function of the distance to the object.

Beam forming means could split up the emitted beam from the light source into formed light beam(s) indicating on the target the size and position, from where the infrared detector means receives radiation. The light source beam(s) and the beams from the object to the infrared detector means are preferably coaxial to each other. Then, the light source is small and mounted in a hole cut out in an infrared objective system.

According to the invention an Infrared camera is provided with a light source emitting a narrow beam within the visible region towards the target to be inspected. On the infrared camera display there may also be a marker of where the light source is pointing. The operator knows then that when the thermal anomaly and the marker in the display is overlapping the light source points out the faulty part in the visible space. Thus, the operator can see a light spot on the target and identify it with his/her eye.

ADVANTAGES

The proposed invention speeds up and reduced the risk of accidentally pointing out the wrong part when performing infrared inspection of for example electrical installations buildings, pluming installations or the like.

BRIEF DESCRIPTION OF THE DRAWINGS

For a more complete understanding of the present invention and for further objects and advantages thereof, reference is now made to the following description of examples of embodiments thereof—as shown in the accompanying drawings, in which.

DETAILED DESCRIPTION OF PREFERRED EMBODIMENTS

Figure 1:
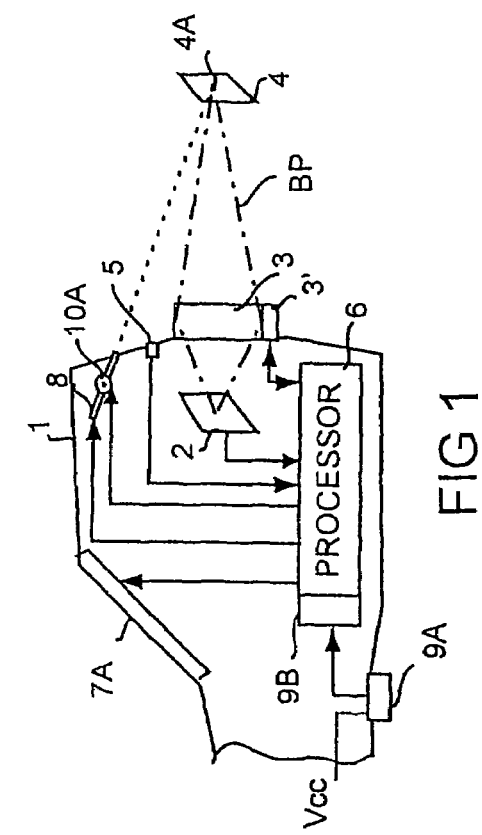
FIG. 1 illustrates schematically a first embodiment of the invention.

Referring to FIG. 1, an IR camera 1 comprises a focal plane array 2, below called FPA, as the recording medium. It is to be preferred to have a non-moving kind of sensor system. The FPA 2 could comprise micro-bolometers or other kind of chilled or un-chilled sensor elements. It is, however, to be noted that the camera is not limited to the kind of recording medium.

The camera has optics 3 focusing the camera on an object 4 to be recorded on the FPA 2. A beam path BP from the center of the object 4 to the center of the FPA illustrates the beam path in relation to the optics 3. The optics 3 could comprise lenses or curved mirrors. The focusing feature could be automatic by means of a distance meter 5, the signal from which operates an adjustment device 3' for the optics, possibly by means of a processing device 6. The operator could instead focus the optics by hand. The distance meter 5 could be seated both above (as shown) or below the optics 3, or at the side of it.

The processing device 6 is also connected to the FPA 2 to make all necessary adjustments to the signals from the FPA-elements to adapt them to be shown on a monitor or display 7A provided on the camera housing. The whole image recorded on the FPA 2, or other recording medium, in the camera could be seen on the monitor or display 7. The camera could be of video-type and/or record still images.

As discussed above the processing device 6 could be connected to the distance meter 5 and to the adjustment device 3' for the optics 3 and control the optics to focus the object 4 on the FPA. A key 9A operated by the camera person supplies a supply voltage $V_{CC}$ to the processing device 6 and a communication device 9B connected to the processing device 6. The communication device 9B could serve as input or output for data to and from the camera. The units 6 and 9B could in the practice be united and wirelessly, for example by the Bluetooth-method, send and transmit signals to and from external units. All this is common in the art and is therefore not described in further detail.

The object 4 is schematically illustrated as a rectangle in order to point out the fact that it is such a part of an object that will be recorded in the FPA 2. It is that part that is necessary to indicate on the actual object to be recorded for the person maneuvering the camera in order to make it easy for him to know where the camera is directed. A light source 8 having a narrow visible beam, preferably a laser, emitting light within the visible wavelength region, is provided inside or outside the IR-camera 1. In the embodiment shown in FIG. 1 the light beam is directed to hit the object 4 at a hit spot 4A preferably near to the middle of the rectangle.

The light source 8 has preferably a visible wavelength separable from the wavelength region recorded by the camera 1. This means that the light on the object caused by the pointing light source 8 will not be seen in the IR image captured by the FPA of the object.

The infrared camera can preferably have a light source parallel compensation function. The software in the processing device 6 is adapted to compensate for the focus distance provided by the distance meter 5, or by movements of the optics 3 made by the operator. Therefore, the light source 8 could be angled in an appropriate direction by a motor 10A in order to direct the beams from the light source 8. The light source 8 could instead be angled by hand by the person handling the camera but this it not very practical. The processing device 6 calculates this angle making use of the signal from the distance meter 5. The processing device 6 then controls the motor 10A.

The camera is using auto focus or manual focus to move the lenses or mirrors to focus the object 4 to the FPA 2. The adjustment of the optics is sent to the processing device 6. When the camera is focused at for example 2 m the processing device 6 is programmed to calculate the rate of parallel error for a 2 m distance to the target. The processing device 6 could then preferably create and move marker or markers on the display 7A to such a position that the marker marks the point to where the laser is pointing.

Figure 2:
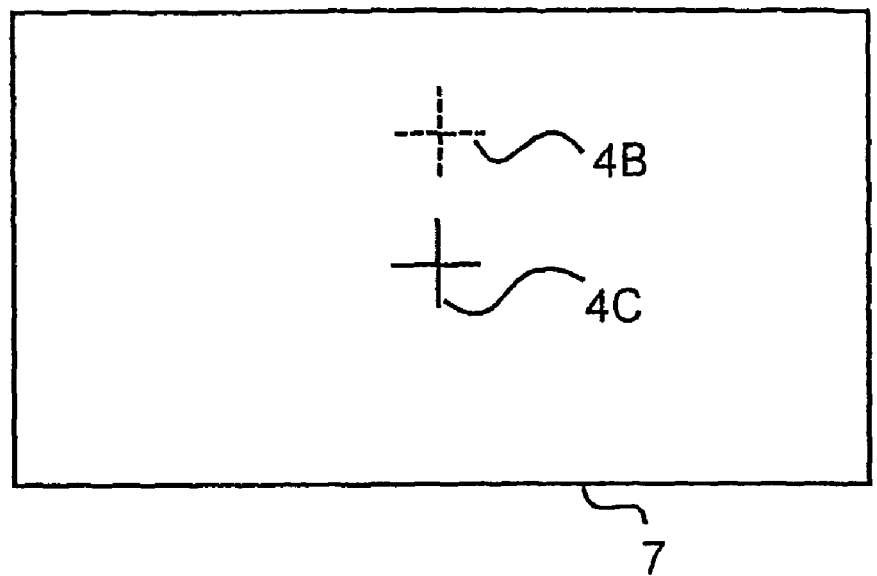
FIG. 2 and FIG. 3 illustrate markers on a display.

In FIG. 2 two cross markers 4B and 4C are set. The dotted marker 4B represents the hit spot on the target, when the light source is directed parallel to the optical axis of the camera. Thus, the processing device has then calculated where it should place the graphical created marker on the display. The beam path of the light source thus does not need to be angled in any way. This could also be an embodiment, because then there is no need for angular control of the beam from the light source.

However, if the processor controls a parallax compensation device, either of the kind angling the light source or of the kind bending its emitted beam, to move the beam from the light source 8 to the middle of the object to be monitored, or to any other predetermined position a continuously drawn cross marker 4C then represents the wanted hit spot 4A on the target object 4, after that the light source beam has been directed to its intended position. Thus, it is the processing unit 6 that calculates the position where the marker ought to hit the object shown on the image on the display 7 and sets the markers on the display. The markers are thus not derived from the signals from the FPA.

In this way the processing device 6 always move the markers on the infrared display as a function of the focus distance to the object. The processing device 6 also controls the compensation device 10A in order to compensate it to adjust the beam direction to the distance to the target provided by the distance meter 5. In this way the hit point 4A on the target could always be adjusted to about the middle of the target, or in some other wanted spot to avoid a parallel pointing error due to that the light source is not positioned mechanical in the center axis of the infrared sensor element.

Figure 3:
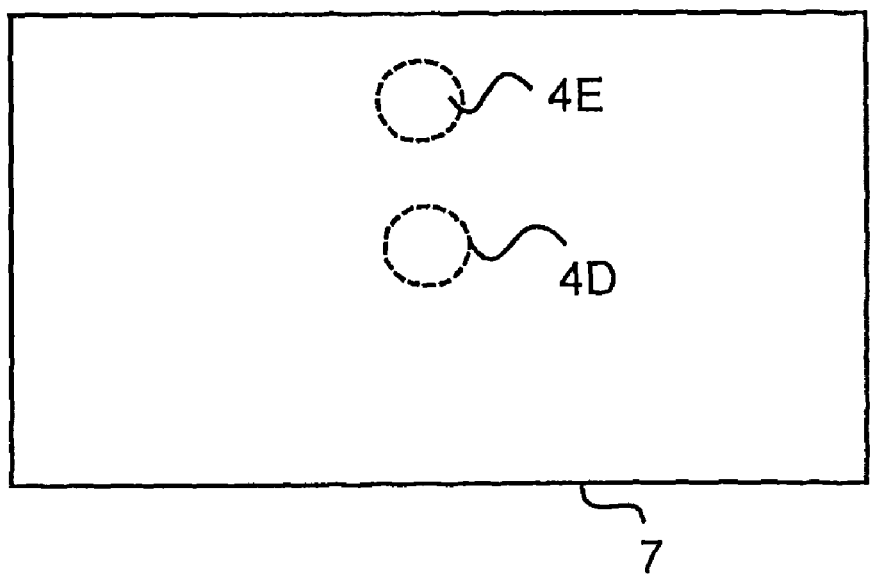

FIG. 3 illustrates that the marker set by the processing device on the display could have some other configuration as a cross, here it is represented by a dotted circle 4D, surrounding the whole measuring dot. Thus, in this embodiment the mark fills the whole measuring point. The mark could be a circle, an oval, a rectangle, a polygon or the like. Such a mark is emitted by the light source device towards the object. It is also created by the processing device 6 to be illustrated on the display 7A. In a case like the one shown in FIG. 3 the operator could be provided with means to widen or diminish the width of the mark, for example make the radius of the circle 4D longer or shorter in order to provide the shortest radius for providing a correct measuring result.

The circle 4D is provided after that a parallax compensation has been made for example by angling the light source device. A circle 4E is shown above the circle 4D. The circle 4E represents the mark on the object, when no parallax compensation is made. Thus, the light source device need not be compensated for. It could just emit its beam(s) parallel to the direction of the camera sighting direction. The processing means could then compute and create the mark to be shown in the image on the display 7A at the spot in the image representing the hit spot on the actual object.

It is useful to have the wavelength of the laser visible on the IR image in order to actually see the laser point on the object on the display. Then, it could be useful to have a filter in the optics, which transmits the near infrared wavelength region for the camera and a narrow region around the visible wavelength of the laser. The optics could then have a lens system transmitting both infrared and visible light or be of a reflecting kind comprising curved mirrors.

Figure 4:
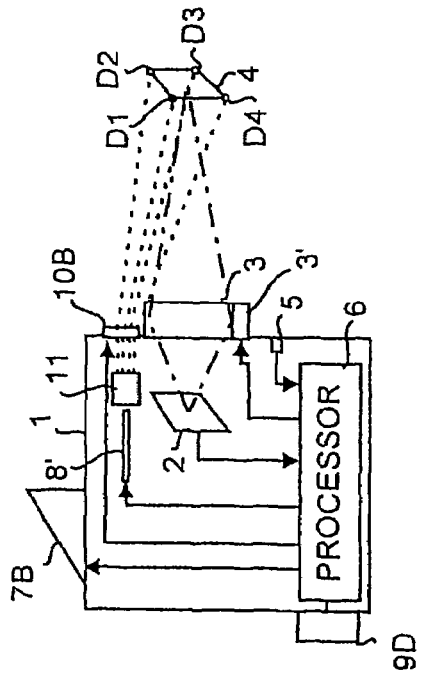
FIG. 4 illustrates schematically a second embodiment of the invention.

Referring to FIG. 4, the corners D1, D2, D3, and D4 of the object 4 are marked. The emitted beam from the light source 8' could by a prism or other optical device 11 be split up into multiple light beams in order to hit a corner each of the object 4. The optical device 11 could instead form the light source 8' beams to make a circular or square pattern around the part of the visual object to be shown. Thus the optical device could function as a beam forming means splitting up the emitted beam from the light source 8' into formed light beam(s) indicating on the target the size and position, from where the infrared detector means, (the FPA) 2 receives radiation. Thereby, the operator knows how large the object 4 need be to get accurate temperature readings.

As illustrated in FIG. 4 it is possible to have a parallax compensation device 10B in front of the light source 8' bending the beams towards the target. The bending is exaggerated in the FIG. 4. The processing device 6 controls the bending features of the compensation device 10B making use of the signal from the distance meter 5 or the focusing control 3'. In this embodiment a communication device 9D is connected to the processing device 6 and provided outside the housing. The operator could here re-program and insert new data into the processing device 6, and also derive data to external devices.

Figure 5:
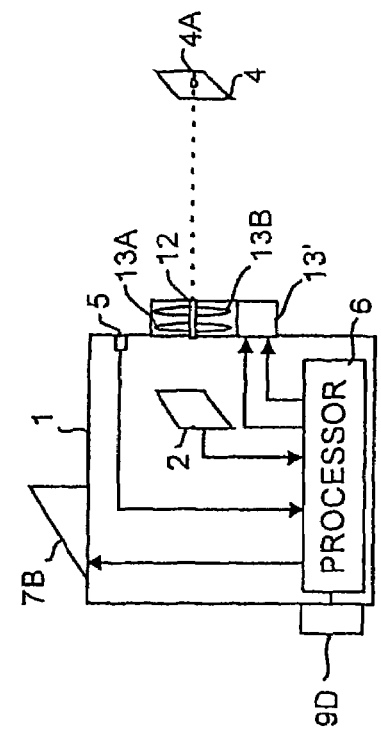
FIG. 5 illustrates schematically a third embodiment of the invention.

Referring to FIG. 5, a third embodiment eliminates or reduces the parallax fault by letting the narrow beam from the light source 12 go out from the center of the infrared optics 13A, 13B. Thus, the beam and the recording are made coaxial. As shown in FIG. 5 the light source 12 could then be small and mounted in a hole cut out in a infrared lens system 13A, 13B representing the infrared optics. The processing device 6 controls the on or off function of the light source 12 through the same control means 13', which controls the focusing of the optics 13A, 13B.

Figure 6:
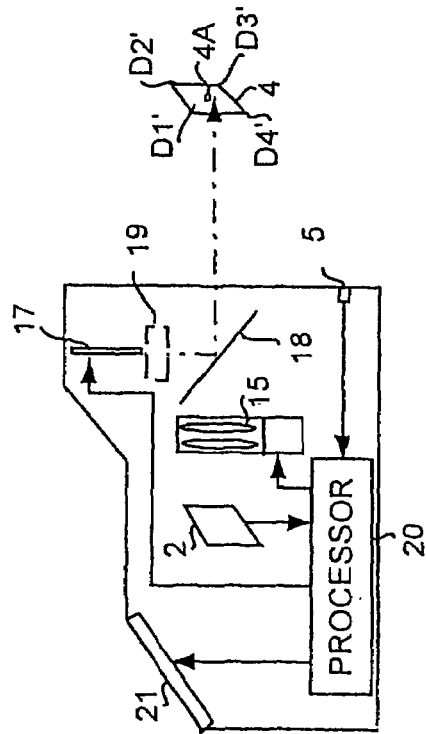
FIG. 6 illustrates schematically a fourth embodiment of the invention.

Referring to FIG. 6, a fourth embodiment is provided with an infrared lens system 15, which transmits both infrared and visible light, or comprises optics of reflecting kind. The object 4 is thus focused on the FPA 16. The light source 17 is vertical in this embodiment and its light is bent 90° by a half transparent disk 18, which reflects visible light and transmits IR light. The disc 18, also called beam splitter, is placed in front of the optics 15 and is preferably 45° oblique to the optical axis of the optics 15.

A prism or other optical device 19 could be placed in front of the light source 17 in order to split up the beam from the light source 17 in practically the same way as in the embodiment shown in FIG. 4. The split beams are then spread in different directions to hit the target in the corners D1', D2', D3', and D4'. The device 19 could also comprise a controllable lens systems or the like controlled by the processor 20. Instead, the light source 17 and the device 19 could be controlled to different angular positions in order to direct the light source beam(s) in wanted directions. If the positions of the FPA 16, the light source 17 with its controllable beam splitter device 19 and the lens system 15 are properly dimensioned in relation to each other then the spots on the target could always be positioned on the target where the recorded IR image of it has its corners. The processing device 6, which preferably is a computer, calculates the image of the object from the individual pixel elements in the FPA 2 and presents is on a display 21, possibly also together with calculated marker or markers representing the hit spot or spots on the target object 4.

It is to be observed that the Figures in this specification are mere schematic and that there are other elements inside the camera, which are omitted because they are not a part of the actual invention.

It has been described above that the light from the light source is emitted simultaneously as the image is recorded. However it is also convenient to first direct the beam from the light source on a part of the object to be inspected. Thereafter, an infrared image or a video recording of the part or checking in the infrared camera could be taken. It is to be noted that the IR image or the video recording preferably is stored digitally.

When inspecting objects, in which thermal anomalies are difficult to see by the bare eye of a camera operator, for example when looking for missing or bad insulations, structural damages, for example missing of reinforcements, cracks in concrete walls, electrical installations, moisture, or water damages, the need to point out where the actual fault is crucial. This is due to the fact that the anomaly or fault sometimes can not be identified at all on an otherwise completely uniform or painted surface. One method is actually to find the anomaly with the camera, point out it with the light source, the laser, and then, if possible, to actually mark the bad part with spray color or a pen.

The inspection of electrical installations could comprise circuit breakers, fuses, bus bars, connectors, electrical conductors, transmission distribution lines, etc.

A marking of the anomalies could also be to set the marking on a digital copy of the image. The digital image could be provided with for example a red arrow or the like pointing at the anomaly. Thus the marking could also be provided on the image.

Figure 7:
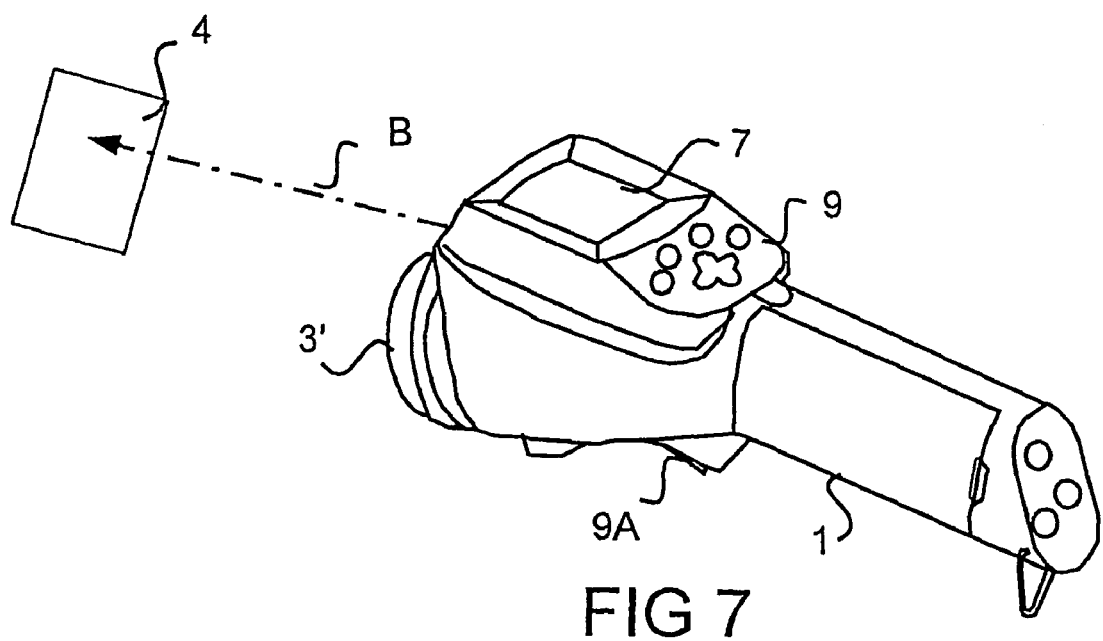
FIG. 7 shows an embodiment of a possible design of the camera according to the invention.

FIG. 7 shows an embodiment of a possible design of the camera according to the invention. The camera 1 is preferably handheld and has the optic housing 3' directed to the object 4. A beam B from the light source (not shown) hits the object. The operator sees the image of the object on the display 7. He could control the camera on the key board 9 and also with a key 9A with his/hers forefinger.

One skilled in the art will appreciate that the present invention is not limited to the embodiments disclosed in the accompanying drawings and the foregoing detailed description, which are presented for purposes of illustration only, but it can be implemented in a number of ways, and it is defined by the following claims.

We claim:

1. A method for identifying an object (4) in space, which is monitored by an infrared camera having detector means (2) sensitive for infrared radiation and optics (3; 13A, 13B; 15) for focusing an object to be monitored on the detector means, characterized by
providing a light source (8; 8'; 12; 17) having a narrow beam within the visible wavelength region; and
pointing the beam at the object monitored by the infrared camera.

2. A method according to claim 1, characterized by
dividing the light from the light source into several light beams; and
pointing the beams so as to mark the extension of the area on the object to be viewed in the infrared camera.

3. A method according to claim 2, characterized in that extending the marking to be the smallest area for making a correct measurement, which the whole measuring point fills.

4. A method according to claim 1, characterized by
directing the beam(s) from the light source to hit the object at predetermined places in relation to what is shown on the infrared image;
calculating the places in the infrared image for the hit spots; and
showing the calculated markers on the infrared image.

5. A method according to claim 1, characterized in that the camera measures the temperatures shown on its display.

6. A method according to claim 1, characterized by
first directing the beam from the light source on to a part of the object to be inspected; and
thereafter storing an infrared image or a video recording of the part digitally or checking in the infrared camera.

7. A method according to claim 1, characterized by
first directing the beam from the light source on to a part of the object to be inspected; and
thereafter checking in the infrared camera if the inspected part has any thermal anomalies.

8. A method according to claim 1, characterized by
providing the beam path from the light source concentric to the beam path from the object to the detector means.

9. A method according to claim 1, characterized by
providing the light source at the side of the beam path from the object to the detector means;
pointing the light source parallel to an optical axis of the camera; and
creating a graphic mark on a camera display at the place on the display representing the place of the hit spot of the light source beam on the monitored object.

10. A method according to claim 1, characterized by
providing the light source at the side of the beam path from the object to the detector means; and
compensating the parallax of the beam from the light source such that the beam hits the object at wished position or positions.

11. A method according to claim 1, characterized by
emitting the light from the light source simultaneously as the image is recorded.

12. A method according to claim 1, characterized by
first directing the beam from the light source on a part of the object to be inspected; and
thereafter storing an infrared image or a video recording of the object to be monitored digitally or checking in the infrared camera.

13. A method according to claim 1 when inspecting objects, in which thermal anomalies are difficult to see by the bare eye of a camera operator, characterized by
finding an anomaly with the camera;

pointing out the fault with the light source (8; 8'; 12; 17) on the object.

14. A method according to claim 13, characterized by thereafter marking the bad part.

15. A method according to claim 13, characterized by pointing out the fault graphically on the camera image; setting the pointing on a digital copy of the image.

16. An infrared camera comprising detector means (2) sensitive for infrared radiation and optics for focusing an object (4) to be monitored on the detector means, characterized by light source means (8; 8'; 12; 17) emitting at least one narrow beam within the visible wavelength region towards the object (4) to be imaged by the detector means.

17. The infrared camera according to claim 16, further comprising:
   a distance meter measuring the distance to the object to be monitored; and
   an adjustment device for the optics operated by means of signals derived from the distance meter.

18. The infrared camera according to claim 17, further comprising a processing device connected to the distance meter and to the adjustment device for the optics, controlling the optics to focus the object on the detector means.

19. The infrared camera according to claim 18, further comprising software in the processing device adapted to compensate for the focus distance provided by the distance meter, or by movements of the optics made by the operator, in order to move the beams from the light source to hit the target object at a wished hit spot.

20. The infrared camera according to claim 18, wherein the processing device is connected to a display showing the monitored IR image and computes at least one marker representing the hit point of the light beam(s) emitted from the light source on the object to be shown graphically on the camera display.

21. The infrared camera according to claim 20, wherein the camera measures temperatures shown on the display.

22. An infrared camera according to claim 20, characterized in that the marker (4B; 4E) on the display (7A; 7B) is shown on the display displaced from the middle of the display in the same sense that the light source is displaced in relation to the optical axis of the camera.

23. An infrared camera according to claim 20, characterized in that when the light source (8; 8') is provided at the side of the detector means (2) the processing device (6) is adapted to move the markers (4C; 4D) on the infrared display (7A; 7B) in the same sense as the light source beam is moved to hit the object, i.e. as a function of the focus distance to the object to compensate for the parallax.

24. The infrared camera according to claim 18, for inspecting objects, in which thermal anomalies are difficult to see by the bare eye of a camera operator, wherein the processing device is adapted to point out the fault graphically on the camera image, and to set the pointing on a digital copy of the image.

25. The infrared camera according to claim 16, further comprising an auto focus means to adjust the optics to focus on the object.

26. An infrared camera according to claim 16, characterized by a parallax compensation device (5, 6, 10A) comprising a motor (10A) or manual mechanical adjustment means setting the light source (8) in a controlled angular direction to direct its beam towards the target.

27. An infrared camera according to claim 26, characterized in that the parallax compensation device is controllable in relation to the focal distance to the target.

28. An infrared camera according to claim 16, characterized by a parallax compensation device (5, 6, 10B) in front of the light source (8') bending the visible light source beam towards the target.

29. The infrared camera according to claim 16, further comprising a filter means in the optics, which transmits the near infrared wavelength region for the camera and a narrow region around the visible wavelength of the laser.

30. An infrared camera according to claim 16, characterized by beam forming means (11; 19) splitting up the emitted beam from the light source (8'; 17) into formed light beam(s) indicating on the target the size and position, from where the infrared detector means (2) receives radiation.

31. An infrared camera according to claim 16, characterized in that the light source (12; 17, 18) beam(s) and the beams from the object (4) to the infrared detector means (2) are coaxial to each other.

32. An infrared camera according to claim 31, characterized in that the light source (12) is small and mounted in a hole cut out in an infrared objective system (13A, 13B).

33. An infrared camera according to claim 31, characterized by
   an oblique half transparent disc (18) placed in front of an infrared objective system of the camera; and in that
   the beam(s) from the light source (17) are directed to be reflected by the disc (18), which transmits the infrared radiation from the target object (4) to the infrared detector means (2).

34. An infrared camera according to claim 16, characterized in that the infrared detector means (2) is an infrared focal plane array (FPA).

* * * * *

UNITED STATES PATENT AND TRADEMARK OFFICE
Certificate

Patent No. 7,034,300 B2                                                                                 Patented: April 25, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: U. Torbjorn Hamrelius, Sollentuna (SE).

Signed and Sealed this Twenty-fourth Day of June 2008.

DAVID P. PORTA
*Supervisory Patent Examiner*
Art Unit 2884